Patented Nov. 14, 1939

2,179,551

UNITED STATES PATENT OFFICE 2,179,551

DYESTUFFS AND DYESTUFF INTERMEDIATES OF THE ANTHRAQUINONE SERIES

Donald P. Graham, Wilmington, Del., assignor to E. I. du Pont de Nemours & Company, Wilmington, Del., a corporation of Delaware No Drawing. Application June 25, 1938, Serial No. 215,873

3 Claims. (Cl. 260—303)

This invention relates to the preparation of new dyestuffs and dyestuff intermediates of the anthraquinone series, and has for its object the preparation of new compounds of the general formula:

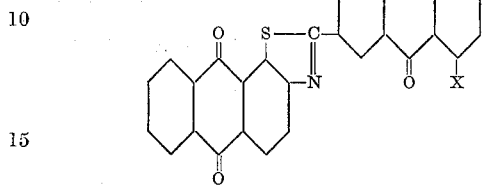

in which X stands for amine substituents of the class consisting of amino, arylsulfonylimino and aroylamino radicals.

These new dyes and dyestuff intermediates are prepared from 1:4-dichloro-6-anthraquinonecarbonyl chloride, an intermediate which heretofore has not been employed to any extent in the manufacture of dyes of commerce, and from which I have produced dyes which have good fastness properties and which dye in shades ranging from tan to reddish brown. These products are further characterized by their good printing properties.

The products of this invention are prepared by reacting 1:4-dichloro-6-anthraquinonecarbonyl chloride with 1-mercapto-2-aminoanthraquinone to give the C-(1':4'-dichloro-anthraquinonyl-6')-1:2-anthraquinonethiazol, and then replacing the chlorine atoms with arylsulfonylimido groups. On hydrolysis of the arylsulfonylimido groups the 1:4-diamine is obtained which is then condensed with aromatic acid chlorides to give the new diaroylamino-dyestuffs.

The following examples are given to illustrate the invention. The parts used are by weight.

Example 1

18 parts of 1-mercapto-2-aminoanthraquinone sodium salt and 25 parts of 1:4-dichloro-6-anthraquinonecarbonyl chloride are slurried in 200 parts of o-dichlorobenzene. The charge is stirred at 30 to 40° C. for 1 hour and is then heated to 170 to 180° C. for 2 hours, cooled to 80° C., filtered, and washed with 100 parts cold o-dichlorobenzene, followed by alcohol. The cake is dried. The product is a pale greenish olive solid dissolving in sulfuric acid with a yellow to yellow olive color.

25 parts of the above thiazole condensation product is slurried in 150 parts of nitrobenzene with 25 parts of p-toluenesulfonamide, 25 parts of sodium acetate, 2.5 parts of copper acetate, and 0.25 part of copper powder. The charge is heated to 200 to 210° C. for 3 hours, cooled to 40° C., diluted with 100 parts of solvent naphtha, and filtered. The cake is washed with alcohol, followed by water, and dried. The product is a brown solid dissolving in sulfuric acid with a brown color.

31 parts of this dried cake is dissolved in 600 parts of 96% sulfuric acid and the solution allowed to stir for 2 hours at 30° C. The charge is then cooled to below 10° C., drowned in 4000 parts of ice water, filtered, washed acid-free, and dried. The resulting diaminodianthraquinonylthiazole is a red brown solid dissolving in sulfuric acid with a yellow to brown color.

18 parts of the diaminodianthraquinonylthiazole are slurried in 360 parts of nitrobenzene and heated to 150° C. 15 parts of benzoyl chloride are added during 15 to 20 minutes at 150 to 160° C. and the charge is stirred at this temperature for 30 minutes longer. It is then diluted with 100 parts of o-dichlorobenzene, cooled to 140° C., filtered and the cake washed with 100 parts of nitrobenzene, followed by alcohol, and dried.

The product which has the following formula:

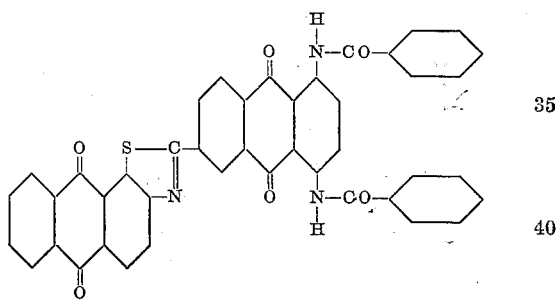

is a red brown solid dissolving in concentrated sulfuric acid with a yellow color and dyeing cotton in red brown shades from a violet colored vat.

This dyestuff may be pasted from sulfuric acid in the usual manner and the paste purified by oxidation with alkaline sodium hypochlorite.

In a similar manner, other aromatic acid chlorides may be condensed with the diaminodianthraquinonylthiazole. By substituting 2-anthraquinonecarbonyl chloride, or 1-chloro-2-anthraquinonecarbonyl chloride in the above example for the benzoyl chloride, compounds are obtained which dye in similar shades. With 1:9-isothiazolanthron-2-carbonyl chloride, a product is obtained which dyes in tan shades. Other aromatic acid chlorides of the benzene and anthraquinone series may, of course, be substituted for those specifically mentioned.

The 1:4 - dichloro - 6 - anthraquinonecarbonyl chloride employed as the starting material may be prepared by heating the 1:4-dichloro-6-anthraquinonecarboxylic acid of German Patent 255,121 with phosphorous pentachloride in a solvent such as toluene, solvent naphtha, etc.

I claim:

1. Compounds of the following formula:

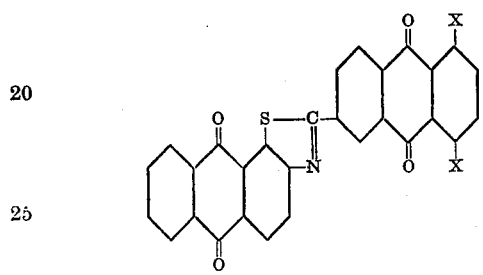

in which X stands for an amine substituent of the class consisting of amino, arylsulfonylimino, and aroylimino-groups.

2. Dyestuffs of the formula:

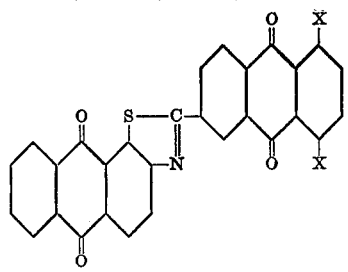

in which X stands for aroylimino groups, which dyestuffs dye cotton in shades ranging from tan to red brown.

3. The compound:

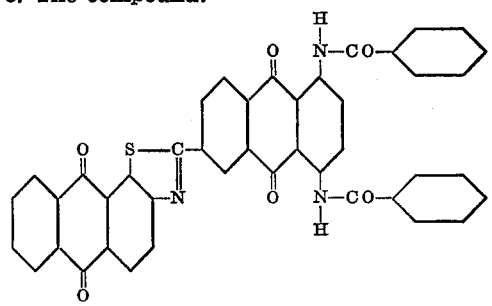

which dyes cotton in red brown shades from a violet vat.

DONALD P. GRAHAM.